(12) United States Patent
Kim et al.

(10) Patent No.: US 9,525,926 B2
(45) Date of Patent: Dec. 20, 2016

(54) ACOUSTIC SENSOR APPARATUS AND ACOUSTIC CAMERA FOR USING MEMS MICROPHONE ARRAY

(75) Inventors: Young-Gi Kim, Daejeon (KR); Kang-Hyun Lee, Daejeon (KR); Jun-Goo Kang, Daejeon (KR)

(73) Assignee: SM INSTRUMENT CO., LTD., Daejeon (KR)

(*) Notice: Subject to any disclaimer, the term of this patent is extended or adjusted under 35 U.S.C. 154(b) by 46 days.

(21) Appl. No.: 14/239,036

(22) PCT Filed: Aug. 19, 2011

(86) PCT No.: PCT/KR2011/006108
§ 371 (c)(1),
(2), (4) Date: Mar. 21, 2014

(87) PCT Pub. No.: WO2013/024926
PCT Pub. Date: Feb. 21, 2013

(65) Prior Publication Data
US 2014/0241548 A1    Aug. 28, 2014

(30) Foreign Application Priority Data

Aug. 18, 2011  (KR) .................... 10-2011-0082124

(51) Int. Cl.
| H04R 1/02 | (2006.01) |
| H04R 1/08 | (2006.01) |
| H04R 3/00 | (2006.01) |
| H04R 29/00 | (2006.01) |
| G01H 11/06 | (2006.01) |

(52) U.S. Cl.
CPC ............. *H04R 1/083* (2013.01); *G01H 11/06* (2013.01); *H04R 1/028* (2013.01); *H04R 3/005* (2013.01); *H04R 29/005* (2013.01); *H04R 2201/003* (2013.01)

(58) Field of Classification Search
None
See application file for complete search history.

(56) References Cited

U.S. PATENT DOCUMENTS

2012/0275621 A1* 11/2012 Elko .................... H04R 19/01
381/92

FOREIGN PATENT DOCUMENTS

| KR | 100217872 | 9/1999 |
| KR | 20020081498 | 10/2002 |

(Continued)

*Primary Examiner* — Regina N Holder
(74) *Attorney, Agent, or Firm* — IPLA P.A.; James E. Bame

(57) ABSTRACT

An acoustic camera for using a MEMS microphone array comprises: an acoustic sensor apparatus (30) comprising a print circuit board (20) on which the plural of MEMS microphone (10) are mounted, to send signals for the detected sound to a data collection unit (40); a data collection unit (40) connected to the acoustic sensor apparatus (30), which samples analog signals related to sound transmitted from the acoustic sensor apparatus (30) to transform into digital signals and transmit them to the central processing unit (40); a central processing unit (50) connected to the data collection unit (40), which calculates noise level based on digital signals related to sound transmitted from the data collection unit (40); and a display unit (60) which is connected to the central processing unit (50), which displays in color the noise level calculated at the central processing unit.

2 Claims, 3 Drawing Sheets

(56) References Cited

FOREIGN PATENT DOCUMENTS

| KR | 20040065395 | 7/2004 |
| KR | 100737730 | 7/2007 |
| KR | 10083239 | 6/2008 |
| KR | 20080073022 | 8/2008 |
| KR | 20100128855 | 12/2010 |

\* cited by examiner

ACOUSTIC SENSOR APPARATUS AND ACOUSTIC CAMERA FOR USING MEMS MICROPHONE ARRAY

BACKGROUND

Exemplary embodiments of the present invention relates to an acoustic sensor apparatus and an acoustic camera for using MEMS microphone array.

An acoustic camera is an ultramodern measurement apparatus for visualizing sound, and a new technology device which is necessary in various fields such as multimedia information devices, household electrical appliances, automobiles, construction, etc. The applicant of the present invention, SM instruments Inc. and the KAIST are the one that have leading technologies in the acoustic camera for using the existing measurement microphone and have made common products.

Korean Registration patent number No. 10-051120 of 'Korean Advanced Institute of Science and Technology' is a method of separating sound filed of the separate sound source by using acoustic holograph, as a method of separating sound field of sound source for using acoustic holography, comprises a first step for measuring sound pressure at several points on hologram and for obtaining hologram spectrum matrix which comprises magnetic spectrum of sound pressure at each point and respective spectrum between respective points; a second step of applying the hologram surface spectrum matrix to the acoustic holography method and calculating a sound source surface spectrum matrix which comprises a magnetic spectrum of sound pressure value at each point and a mutual spectrum between respective points; a third step of determining as a position of sound source a position where the magnetic spectrum of sound pressure value is a maximum in the sound source surface spectrum matrix, and calculating contribution amount of the determined sound source, and a fourth step of renewing, if there is a remaining spectrum matrix which is a subtract of contribution amount of the determined sound source from the sound source surface spectrum matrix, the remaining spectrum matrix into a new sound source surface spectrum and repeating its performance from the third step.

Korean Patent No. 10-0217872 of 'Korean Advanced Institutes of Science Technology' discloses a visualization system of acoustic characteristic, as visualization system for acoustic characteristic which obtains hologram at any hologram surface 22 moving with a sound source for any acoustic characteristic having any wavelength of sound source radiating energy to the surroundings, and calculates acoustic characteristic estimated value in sound filed by using the hologram, comprising a sound source movement measuring means 11, 12; a receiving means 13 for receiving energy radiated from the sound source at the plural positions which are arranged in series at smaller interval than half of the wavelength of the acoustic characteristics in a vertical direction to the movement direction in the region, to generate signals representing the energy; a multiple transmission unit for outputting through one output line the multiple of input signals which comprises a movement direction and a movement velocity of the receiving means 13 and a movement direction and a movement velocity of the sound source which is inputted from the sound source movement measurement means 11, 12 and the signal generated from the receiving means 13; a calculating means 15 for acoustic characteristics estimated value in sound field from the estimated sound characteristics at the hologram 22 outputted from the multiple transmission means 14 wherein the calculating means 15 defines relative coordinates comprising a hologram coordinates which moves correspondingly to a movement direction and a movement velocity of sound source measured by the sound source movement measurement means 11, 12 and receiving coordinates which moves correspondingly to a movement direction and a movement velocity of the receiving means 13 in the region, and the calculating means calculates the acoustic characteristic estimated value in the sound field by fourier transforming for time according to equation no. 1, information for the receiving means 13 from the multiple transmission means 14 outputted as coordinate value in the receiving coordinates.

Korean Patent number 10-08318239 comprises an acoustic sensing unit for sensing sound generated at sound source; a background photographing unit for photographing background on which the sound source locates; a sound source signal generating unit for performing sequentially fourier transformation, beamformation and reverse Fourier transformation for acoustic signal detected at the acoustic sensor unit and for generating sound source signal which is acoustic signal and time signal at sound source surface where the sound source locates; a data generating unit for generating sound quality data at the sound source surface as loudness which is quantitive factor by performing ⅓ octave band analysis processing, a loudness weighted value application, and a processing for calculating overall loudness by determining loudness index at a certain loudness index; a sound quality display unit for displaying sound quality image data generated by overlaying the sound quality data and the image data of the background taken photograph at the background photographing unit.

Korean patent no. 10-2009-0047507 of SM instruments Inc., an apparatus and method for visualizing a moving noise source discloses an apparatus for visualizing a moving noise source comprising at least two pairs of photo sensor units, which locate facing each other on a same photo axis in order to measure acceleration of a noise source moving in a uniform acceleration, for detecting change of photo amount resulting from the passing of the noise source through the photo axis and for generating time signal for when the noise source passes the photo axis; a microphone array sensor unit for generating sound pressure signal by detecting noise from the noise source; a data collection unit connected to the microphone array sensor unit and the photo sensor unit, for collecting the time signal and the sound pressure signal; and a central processing unit connected to the data collection unit, for receiving the time signal and the sound pressure signal from the data collection unit and defining an imaginary sound surface on a side of a certain part of the noise source and outputting sound pressure signal at each grid of the imaginary sound source surface as beam power level corresponding to the sound pressure signal by using a beam formation method, and for outputting to a monitor by mapping the beam power level on an image of the noise source.

Generally, a capacitive microphone based on microelectromechanical system, hereinafter called MEMS microphone has an advantage of overcoming basic limitation of the existing electret condenser microphone, hereinafter called ECM.

A vibration plate having electrical or mechanical reaction in the MEMS microphone is made of dielectric substance such as polysilicon or silicon nitride film and silicon oxide film, and the plate has a reliability in a temperature from −40° C. to 120° C., and has a reliability even in complex temperature/humidity change. In addition, in a case of MEMS microphone using a silicon substrate, it endures even in lead-free surface-mount temperature over 260° C. Due to the above fact that it has a high reliability and it endures even in mount temperature, it surpasses the existing ECM. The ECM can be packed only in a can type, and however the MEMS microphone can be packed according to request of user, and it is suitable to applied fields of the microphone in which it has been minimized and integrated in the present. The MEMS microphone senses capacitive change according to sound pressure which is inputted when uniform DC bias voltage is applied between a vibration plate and a reference plate. The MEMS microphone can be made smaller than most miniature ECMs, and the MEMS microphone is less sensitive to mechanical vibration, temperature change, or electromagnetic field interference than the ECMs. Due to the advantageous characteristics, the microphone is more used not only for hearing instruments or electronic stethoscope but also for cellphone, notebook computer, camcoder and a digital camera, etc.

As described, the microphone array beamformer is a method of searching position of noise source, and it is a method of measuring sound wave generated at noise source by the plural of microphone sensors and showing distribution of noise source like a photograph by processing the signals. It comprises measuring magnitude of sound pressure by restructuring according to characteristics of signals transmitted from each microphone into signals generated at a certain transmission position, and showing the measured sound pressure level as distribution in space to presume position of noise source.

The measurement method of the acoustic camera has been developed for research in special fields, and however due to the advantage of checking distribution of noise source it is also used for research/development in many industry fields.

FIG. 4 shows measurement examples of a microphone array in an abroad research. An area described in red in a noise source distribution shown with a photograph of test object, is the one where strong noise is generated. Through the graph, users can determine by intuition where noise is generated. The existing products in the conventional art use more than 30 expensive measurement microphones and expensive data measurement apparatus, and thereby making products complex and very expensive. One product costs about 100 million dollars FIG. 5 shows a conventional system.

SUMMARY OF THE INVENTION

An object of the present invention is to provide an acoustic sensor apparatus and an acoustic camera for using MEMS microphone array comprising MEMS microphones which is made by changing the existing microphone in an electronic chip in order to be used for mobile phones.

In addition, another object of the present invention is to improve the existing acoustic camera by using MEMS microphone, and to provide an acoustic sensor apparatus and an acoustic camera for using MEMS microphone array which can improve manufacture period and costs by mounting MEMS microphones on a printed circuit board.

In addition, another object of the present invention is to provide an acoustic sensor apparatus and an acoustic camera for using a microphone array which is capable of improving capacity of reflection wave removal by blocking 1/rear soundproofing by using PCB, and to make a popular measurement apparatus to obtain broader market.

To obtain the above objects, in the acoustic sensor apparatus of the present invention, the plural MEMS microphone 10 are mounted on a print circuit board 20.

An acoustic camera for using a MEMS microphone array of the present invention comprises an acoustic sensor apparatus 30 comprising a print circuit board 20 on which the plural of MEMS microphone 10 are mounted, to send signals for the detected sound to a data collection unit 40; a data collection unit 40 connected to the acoustic sensor apparatus 30, which samples analog signals related to sound transmitted from the acoustic sensor apparatus 30 to transform into digital signals and transmit them to the central processing unit 40; a central processing unit 50 connected to the data collection unit 40, which calculates noise level based on digital signals related to sound transmitted from the data collection unit 40; and a display unit 60 connected to the central processing unit 50, which displays in color the noise level calculated at the central processing unit.

The MEMS microphone of the present invention is the microphone in an electronic chip, and a remarkable unit which helps to upgrade the quality of the acoustic camera which needed the plural of microphones (more than 30). In case of using the MEMS microphone, the acoustic camera can be lighter and can be produced in large quantities, thereby obtaining a competitive measurement device.

The present invention provides an acoustic sensor apparatus and an acoustic camera for using MEMS microphone array comprising MEMS microphones which is made by changing the existing microphone in an electronic chip in order to be used for mobile phones.

In addition, the present invention improves the existing acoustic camera by using MEMS microphone, and provides an acoustic sensor apparatus and an acoustic camera for using MEMS microphone array which can improve manufacture period and costs by mounting MEMS microphones on a printed circuit board.

In addition, the present invention provides an acoustic sensor apparatus and an acoustic camera for using a microphone array which is capable of improving capacity of reflection wave removal by blocking 1/rear soundproofing by using PCB, and to make a popular measurement apparatus to obtain broader market.

DETAILED DESCRIPTION OF THE INVENTION

Hereinafter, an acoustic sensor apparatus and an acoustic camera for using a MEMS microphone array according to an embodiment of the present invention will be described in detail with reference to the accompanying drawings.

Figure 1:
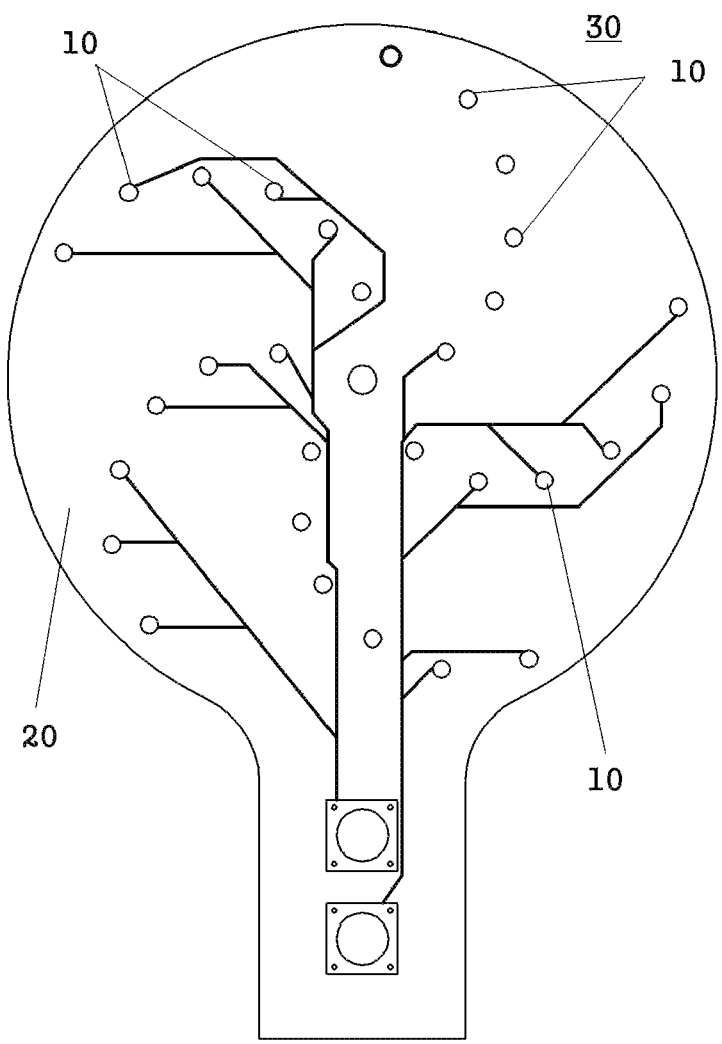
FIG. 1 is a structure view of showing an acoustic sensor apparatus for using a MEMS microphone array according to an embodiment of the present invention.

As shown in FIG. 1, in an acoustic sensor apparatus for using a MEMS microphone array according to an embodiment of the present invention, the plural of MEMS microphone 10 are mounted on a print circuit board 20. The print circuit board 20 comprises circuits. The circuits comprises, for example a power supply circuit or an output circuit for sending electric signals generated from acoustic detection signals.

Electric signals outputted from the output circuit are sent to a data collection unit 40, and the electric signals may pass through a signal amplifier where magnitude of the electric signals is amplified. The signal amplifier may be provided separately from the acoustic sensor apparatus 30, and however the signal amplifier may be provided integrally with the print circuit board 20 for having the MEMS microphone 10.

In the present invention, the MEMS microphone is made by changing the existing microphone in a form of electronic chip in order to be used in mobile phones, etc., and the term "MEMS microphone may include all the general MEMS microphones, for example the capacitor type silicon MEMS mi microphone and the capacitive microphone. As the mobile phone technology develops, it has a great performance for the present, which is second to the microphone for measurement.

As shown in FIG. 1, in the acoustic sensor apparatus for using MEMS microphone array according to an embodiment of the present invention, the MEMS microphone 10 has 2-10 branches which extend radially, the 2-10 MEMS microphones 10 may be arranged in a branch.

In the acoustic sensor apparatus for using MEMS microphone array according to the embodiment of the present invention, the MEMS microphones 10 in a branch may be arranged radially on the straight (not shown), and otherwise as shown in FIG. 1, the microphones may be arranged in a spiral shape, the shape more curved in a rotation direction as it goes further radially.

Figure 3:
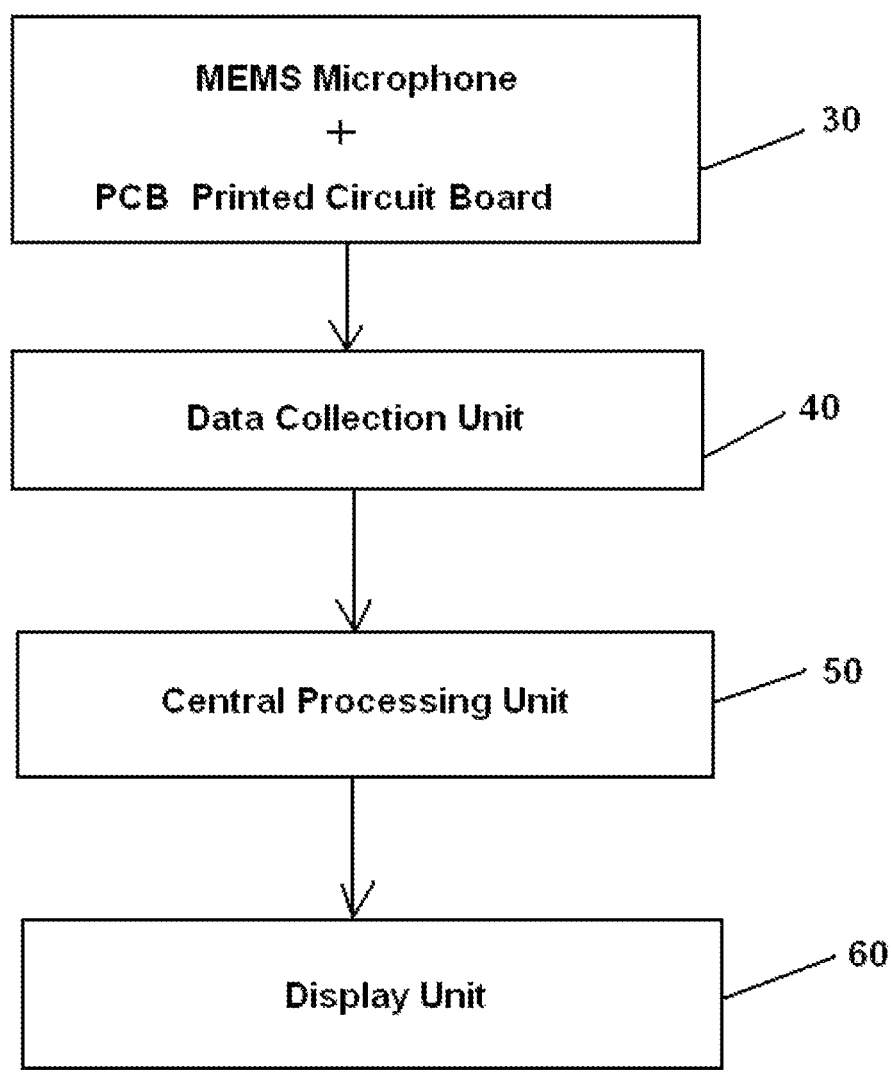
FIG. 3 is a structure view of showing an acoustic camera for using a MEMS microphone array according to an embodiment of the present invention.

As shown in FIG. 3, the acoustic sensor apparatus for using MEMS microphone array according to the embodiment of the present invention comprises an acoustic sensor apparatus 30, a data collection unit 40, a central processing unit 50 and a display unit 60.

Figure 2:
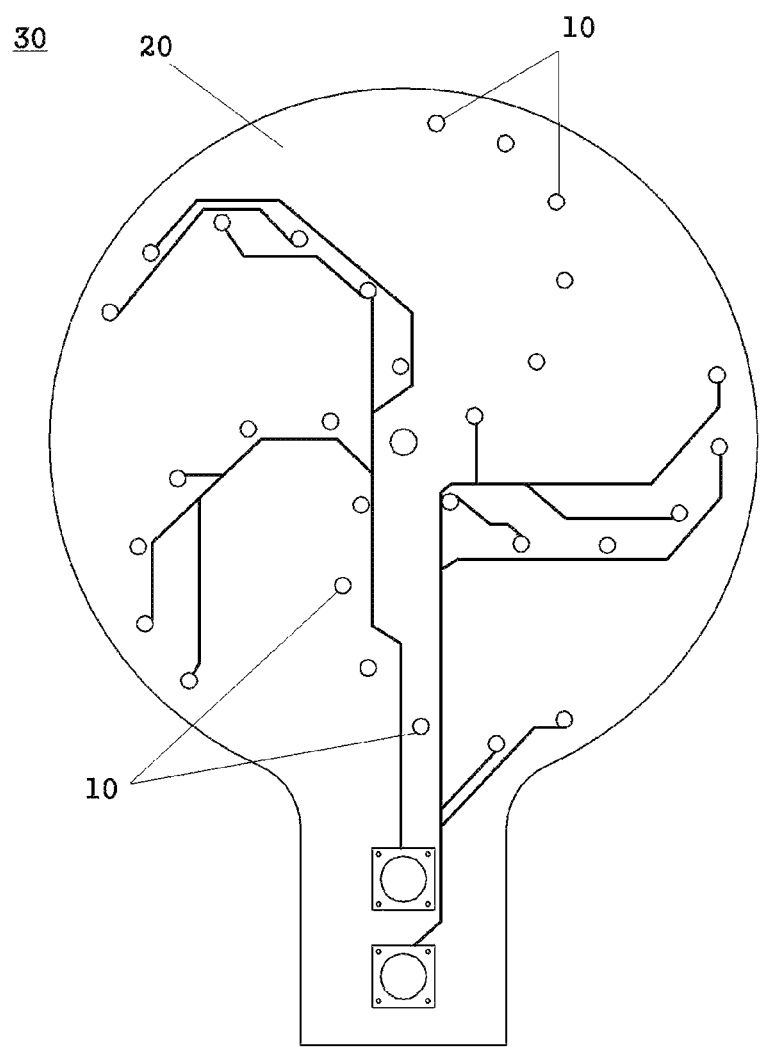
FIG. 2 is a structure view of showing an acoustic sensor apparatus for using a MEMS microphone array according to an embodiment of the present invention.

In the acoustic sensor apparatus 30 in FIG. 2, the plural of MEMS microphone 10 are mounted on the print circuit board 20, and the apparatus sends signals for the detected sounds to the data collection unit. The data collection unit 40 in FIG. 2 is connected to the acoustic sensor apparatus 30. The data collection unit samples analog signals for sound which are transmitted from the acoustic sensor apparatus 30 to transform them to digital signals for sound, and sends the digital signals to the central processing unit 50.

The central processing unit 50 is connected to the data collection unit 40, and calculates noise level related to each MEMS microphone 10 on a basis of the digital signals for sound which are transmitted from the data collection unit 40.

The display unit 60 is connected to the central processing unit 50, and displays in color the noise level related to each MEMS microphone 10 calculated at the central processing unit. The display unit 60 may be a normal monitor.

As shown above, the MEMS microphone 10 has 2-10 branches which extend radially, and 2-10 MEMS microphones 10 are arranged in a branch. The MEMS microphones 10 in a branch may be arranged radially on the straight, and otherwise arranged in a spiral shape, the shape being more curved in a rotation direction as it goes further radially.

While the present invention has been described with respect to the specific embodiments, it will be apparent to those skilled in the art that various changes and modifications may be made without departing from the spirit and scope of the invention as defined in the following claims. Reference numbers in following claims is only for helping understanding of the invention, and the reference numbers does not affect interpretation of scope of claims, and claim scope should not be interpreted in a narrow sense by the reference numbers.

What is claimed is:

1. An acoustic sensor apparatus for using MEMS microphone array, comprising a print circuit board (20) on which the plurality of MEMS microphones (10) are mounted, wherein the MEMS microphone (10) has two to ten branches extending radially, and two to ten MEMS microphones (10) are arranged in a branch, wherein the MEMS microphone (10) in a branch may be arranged radially on a straight line, and otherwise arranged in a spiral shape, the shape being more curved in a rotation direction as it goes further radially.

2. An acoustic camera for using a MEMS microphone array comprising: an acoustic sensor apparatus (30) comprising a print circuit board (20) on which the plurality of MEMS microphone (10) are mounted, to send signals for the detected sound to a data collection unit (40); a data collection unit (40) connected to the acoustic sensor apparatus (30), which samples analog signals related to sound transmitted from the acoustic sensor apparatus (30) to transform into digital signals and transmit them to the central processing unit (50); a central processing unit (50) connected to the data collection unit (40), which calculates noise level based on digital signals related to sound transmitted from the data collection unit (40); and a display unit (60) connected to the central processing unit (50), which displays in color the noise level calculated at the central processing unit;

wherein the MEMS microphone (10) has two to ten branches extending radially, and two to ten MEMS microphones (10) are arranged in a branch, and the MEMS microphone (10) in a branch may be arranged radially on the a straight line and otherwise arranged in a spiral shape, the spiral shape being more curved in a rotation direction as it goes further radially.

* * * * *